United States Patent [19]

Murray

[11] Patent Number: 5,733,014

[45] Date of Patent: Mar. 31, 1998

[54] RESTRAINT HARNESS

[75] Inventor: Connie Murray, Tequesta, Fla.

[73] Assignee: E-Z-On Products, Inc. of Florida, Jupiter, Fla.

[21] Appl. No.: 615,081

[22] Filed: Mar. 14, 1996

[51] Int. Cl.$^6$ .......................... A47D 15/00; A62D 35/00; B60R 21/00; B60R 22/10
[52] U.S. Cl. .......................... 297/485; 297/484; 297/465
[58] Field of Search .................................. 297/485, 484, 297/465

[56] References Cited

U.S. PATENT DOCUMENTS

| | | | |
|---|---|---|---|
| 1,288,170 | 12/1918 | Pick | 297/484 |
| 2,741,412 | 4/1956 | Hinkle | 297/485 X |
| 2,833,344 | 5/1958 | Lucht | 297/465 |
| 2,856,202 | 10/1958 | Dewees | 297/484 |
| 2,856,991 | 10/1958 | Princiotta | 297/484 |
| 2,879,078 | 3/1959 | Dewees | 297/484 |
| 2,979,028 | 4/1961 | Zakely | 119/96 |
| 3,028,200 | 4/1962 | Dye | 297/484 |
| 3,099,486 | 7/1963 | Scott | 297/485 |
| 3,321,247 | 5/1967 | Dillender | 297/484 X |
| 3,380,776 | 4/1968 | Dillender | 297/484 |
| 3,428,029 | 2/1969 | Klickstein et al. | 297/484 |
| 4,143,914 | 3/1979 | Klich | 297/389 |
| 4,226,474 | 10/1980 | Rupert et al. | 297/484 |
| 4,632,425 | 12/1986 | Barratt | 297/485 |
| 4,709,966 | 12/1987 | Parkinson et al. | 297/484 X |
| 4,848,793 | 7/1989 | Huspen et al. | 297/484 X |
| 4,927,211 | 5/1990 | Bolcerek | 297/484 X |
| 5,076,598 | 12/1991 | Nauman | 230/202 |
| 5,080,191 | 1/1992 | Sanchez | 297/465 |
| 5,141,287 | 8/1992 | Grene | 297/485 X |
| 5,378,046 | 1/1995 | Gordy et al. | 297/485 |
| 5,397,171 | 3/1995 | Leach | 297/485 X |
| 5,435,272 | 7/1995 | Epstein | 297/484 |
| 5,443,037 | 8/1995 | Saleme | 297/485 X |
| 5,540,403 | 7/1996 | Standley | 297/484 X |

FOREIGN PATENT DOCUMENTS

| | | | |
|---|---|---|---|
| 549954 | 12/1922 | France | 297/484 |
| 1186353 | 8/1959 | France | 297/484 |
| 238895 | 3/1965 | Germany | 297/484 |
| 1056714 | 1/1967 | United Kingdom | 297/484 |
| 1124587 | 8/1968 | United Kingdom | 297/484 |
| 1132572 | 11/1968 | United Kingdom | 297/484 |

*Primary Examiner*—Peter M. Cuomo
*Assistant Examiner*—Rodney B. White
*Attorney, Agent, or Firm*—Pennie & Edmonds, L.L.P.

[57] ABSTRACT

A restraint harness is disclosed for securing a passenger to a seat in a vehicle. The harness is particularly well adapted for transporting a passenger who is in a sitting position. The harness has a pair of lateral torso straps adapted to be placed around the torso of the passenger and fastened together. A pair of shoulder straps extend over the shoulders and intersect with the torso straps. A seat strap portion fastens to a seat back and fastens to the harness. An existing vehicle seat belt also fastens to the torso straps to secure the passenger to the seat.

12 Claims, 8 Drawing Sheets

RESTRAINT HARNESS

TECHNICAL FIELD OF THE INVENTION

The present invention relates to a restraining harness for securing a passenger to a vehicle seat.

BACKGROUND OF THE INVENTION

Seat belts are commonly used in passenger vehicles to secure a passenger to a seat, the seat belt typically fastens around the waist of the passenger. In the event of an accident, the seat belt restrains the passenger to the seat instead of the passenger experiencing free flight in the cab of the vehicle. Seat belts in modern vehicles include a shoulder strap and a waist strap to better restrain the passenger's torso to the seat and the seat back in the event of an accident.

Restraint harnesses have been commonly used in vehicles to secure children passengers to bench seats. For example, U.S. Pat. No. 4,226,474 issued to Rupert et al. discloses a restraint vest that utilizes a pair of straps that laterally encircle the torso of the wearer with a pair of straps that extend from the anterior side of the torso over the shoulders to the posterior side of the torso. Anchoring straps are secured to the seat back or to the floor and fasten to the posterior side of the vest.

Nevertheless, the restraint harnesses of the past do not have the capability to accept passengers of varying torso sizes, such as torso width and torso length.

DISCLOSURE OF THE INVENTION

It is, therefore, an object of the present invention to provide a restraint harness for securing a passenger to a vehicle seat.

It is also an object of the present invention to provide a restraint harness for securing a passenger to a vehicle seat, wherein the restraint harness is adjustable in diameter and in length to accommodate different passenger torso sizes.

It is also an object of the present invention to provide a restraint harness for securing a passenger to a vehicle seat, wherein in the event of an accident the harness distributes the forces evenly throughout the harness.

It is also an object of the present invention to provide a restraint harness for securing a passenger to a vehicle seat, wherein the harness has an adjustable fastening means at the posterior side to discourage unauthorized removal of the harness.

It is also an object of the present invention to provide a restraint harness for securing a passenger to a vehicle seat, wherein the harness may be utilized with existing vehicle seats.

It is also an object of the present invention to provide a restraint harness that is easily applied to and removed from the passenger, and wherein the harness is lightweight and easily portable.

According to the present invention, a restraint harness has a plurality of straps for securing a passenger to an existing seat. A pair of torso straps laterally encircle or encompass the torso of the wearer, the first torso strap is positioned approximately around the hip of the wearer and the second torso strap is positioned approximately around the chest of the wearer. A pair of shoulder straps extend anteriorly and posteriorly from the shoulders to a harness anterior side and a harness posterior side. The shoulder straps intersect with and are secured to each of the torso straps at the intersection points. The shoulder straps have an adjustable fastening means on the posterior side of the harness that adjust the diameter of the torso straps. The shoulder straps also each have a longitudinal adjustable feature, therefore the restraint harness is adjustable in width and in length to fit a wide variety of torso sizes. A seat strap portion encircles the existing seat back and fastens to the shoulder straps at the top of the harness and fastens to the hip strap at the sides of the harness. An existing seat belt may also be used to fasten to the hip strap.

The foregoing and other advantages of the present invention will become more apparent from the following description and accompanying drawings.

BEST MODE FOR CARRYING OUT THE INVENTION

Figure 1:
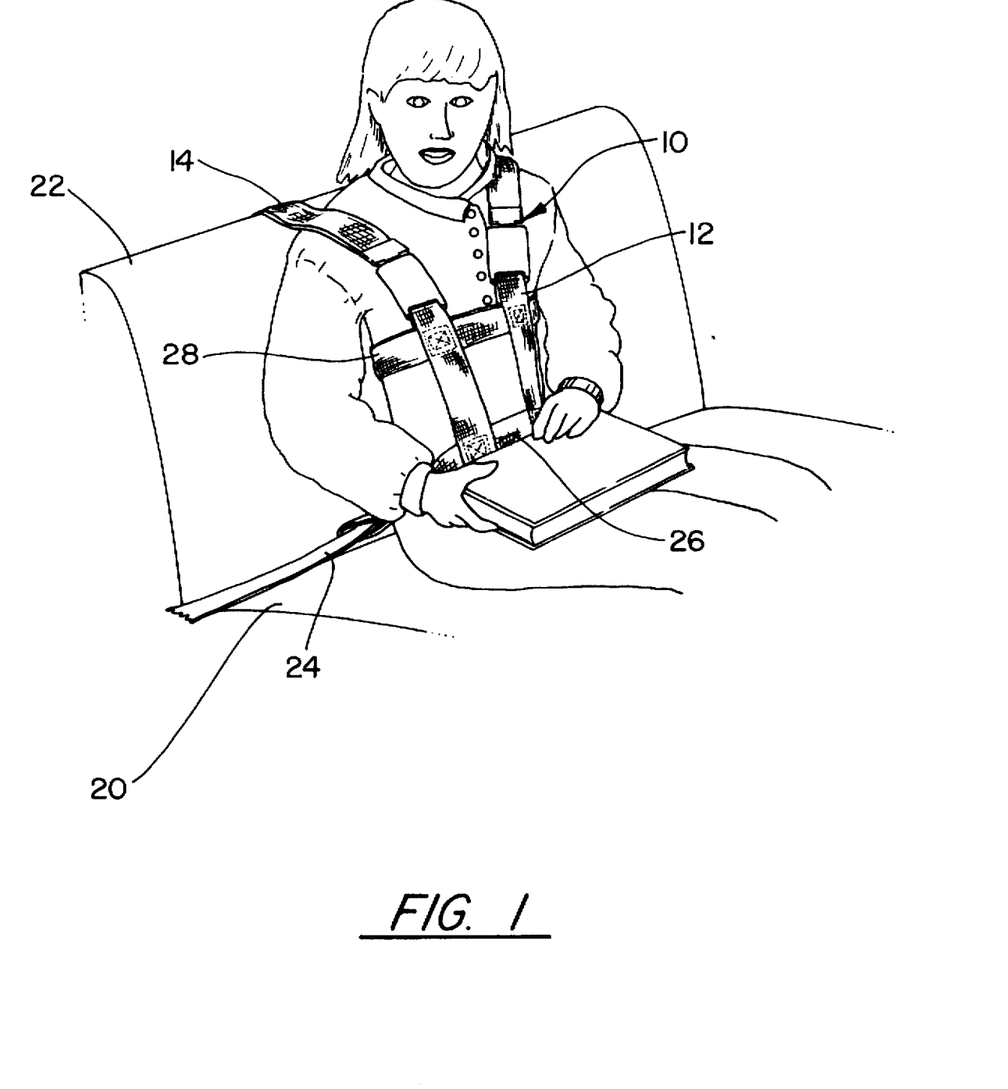
FIG. 1 is a front perspective view of a restraint harness of the present invention shown in use with an existing seat with a seat belt.

According to the present invention, and as shown in FIG. 1, a restraint harness 10 is disclosed that is used for securing a passenger to a seat 20, wherein the passenger is secured to the seat 20 while in a sitting position. The harness 10 is designed for use with a passenger who has a requirement to be restrained or is better suited to be restrained during transportation. The harness 10 of the present invention provides a means for securing the sitting passenger to the vehicle seat.

As shown in FIG. 1, the vehicle seat 20 has a seat back 22 that extends vertically upward from the horizontally positioned seat 20. The seat 20 may have a lap or shoulder belt 24 secured to the seat 20 at the intersection of the seat 20 and the seat back 24.

FIG. 1 shows a passenger in a sitting position on the seat 20. The passenger is secured to the seat 20 by the restraint harness 10 and the seat belt 24. The harness 10 has a vest portion 12 and a seat strap portion 14. The harness 10 also has an anterior side 16 and an opposite posterior side 18. The vest portion 12 comprises a plurality of torso straps. The seat strap portion 14 comprises an assembly of straps that secure the vest portion 12 to the seat 20. The vest portion 12 more particularly comprises a hip or pelvic region strap 26, which generally laterally encircles or encompasses. the hips of the wearer. A chest strap 28 is generally parallel to the hip strap 26 and generally laterally encircles or encompasses the chest area of the wearer at about the apex of the rib cage. The chest strap 28 is adapted to be positioned at the apex of the rib cage so as not apply excess pressure to the soft tissue of the wearer, such at the underarm area.

A pair of shoulder straps are adapted to fit over the passenger's shoulders and to intersect with and be fastened to the hip strap 26 and the chest strap 28 at the intersection points. A right shoulder strap 30 extends from the right shoulder along the anterior side 16 to intersect with the chest strap 28 and then the hip strap 26 at the anterior side 16. The right shoulder strap 30 also extends from the right shoulder along the posterior side 18 to intersect with the chest strap 28 and then the hip strap 26 at the posterior side 18.

Likewise, a left shoulder strap 32, which is opposite to the right shoulder strap 30, extends from the left shoulder along the anterior side 16 to intersect with the chest strap 28 and then the hip strap 26 on the anterior side 16. The left shoulder strap 32 also extends from the left shoulder along the posterior side 18 to intersect with the chest strap 28 and then the hip strap 26. The right and the left shoulder straps 30 and 32 are generally parallel with each other.

A right seat belt loop 34 extends from the hip strap 26 at the anterior side 16, the loop 34 is in close proximity to the right shoulder strap 30. An opposite left seat belt loop 36 extends from the hip strap 26 at the anterior side 16, the loop 36 is in close proximity to the left shoulder strap 32. The right and left seat belt loops 34 and 36 are attached to the hip strap 26 by nylon stitching. The seat belt loops 34 and 36 are adapted to accept the existing seat belt 24. When the seat belt 24 is placed through the seat belt loop 34 and 36, the seat belt 24 overlaps the hip strap 26 as worn by the passenger.

Figure 2:
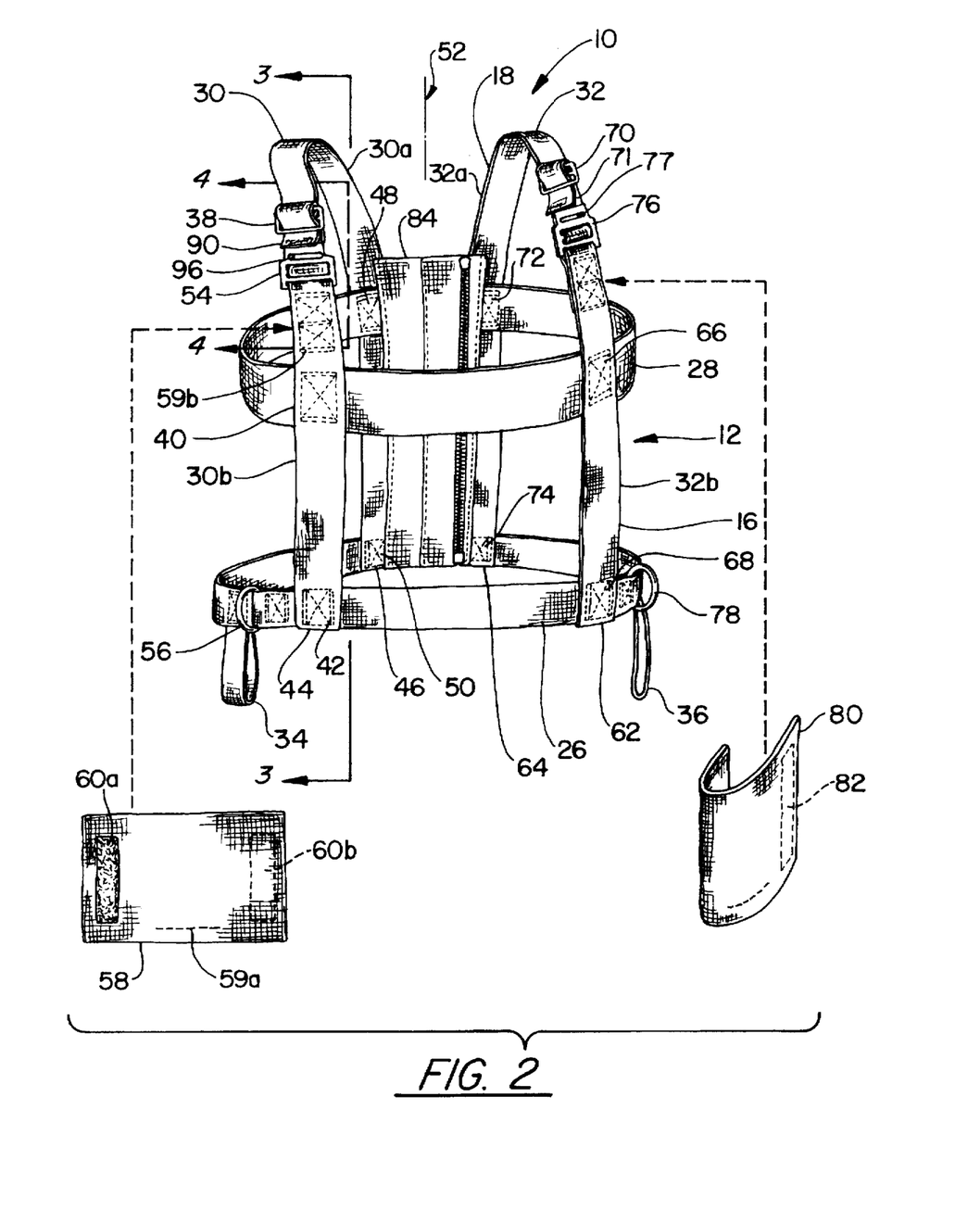
FIG. 2 is a front perspective view of the restraint harness of the present invention.

As shown in FIG. 2, the right shoulder strap 30 has a first end 44 adjacent to the hip strap 26 at the anterior side 16 and a second end 46 adjacent to the hip strap 26 at the posterior side 18. The right shoulder strap 30 intersects at the anterior side 16 with the chest strap 28 at intersection point 40 and with the hip strap 26 at intersection point 42, which is adjacent to the right shoulder strap first end 44. The right shoulder strap 30 intersects at the posterior side 18 with the chest strap 28 at intersection point 48 and with the hip strap 26 at intersection point 50, which is adjacent to the right shoulder strap second end 46. The straps are sewn together at the intersection points using nylon stitching.

Likewise, the left shoulder strap 32 has a first end 62 adjacent to the hip strap 26 at the anterior side 16 and a second end 64 adjacent to the hip strap 26 at the posterior side 18. The left shoulder strap 32 intersects at the anterior side 16 with the chest strap 28 at an intersection point 66 and with the hip strap 26 at an intersection point 68, which is adjacent to the right shoulder strap first end 44. The left shoulder strap 32 intersects at the posterior side 18 with the chest strap 28 at an intersection point 72 and with the hip strap 26 at an intersection point 74, which is adjacent to the left shoulder strap second end 64. The straps are sewn together at the intersection points using nylon stitching.

Figure 3:
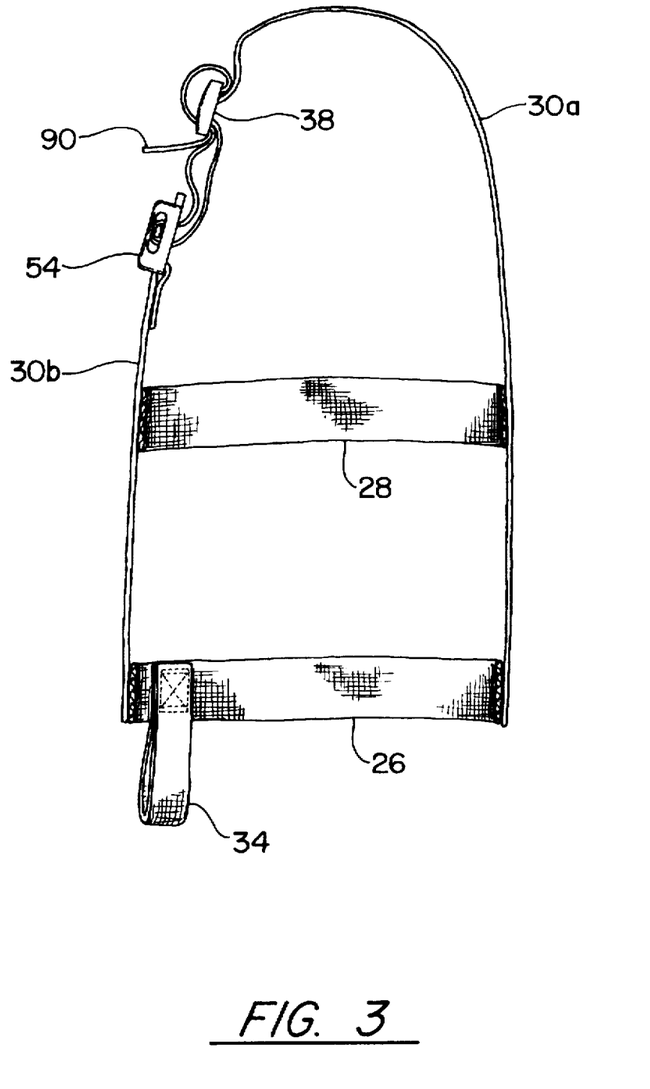
FIG. 3 is a partial cross sectional view of the restraint harness of the present invention taken from line 3—3 of FIG. 2.
Figure 4:
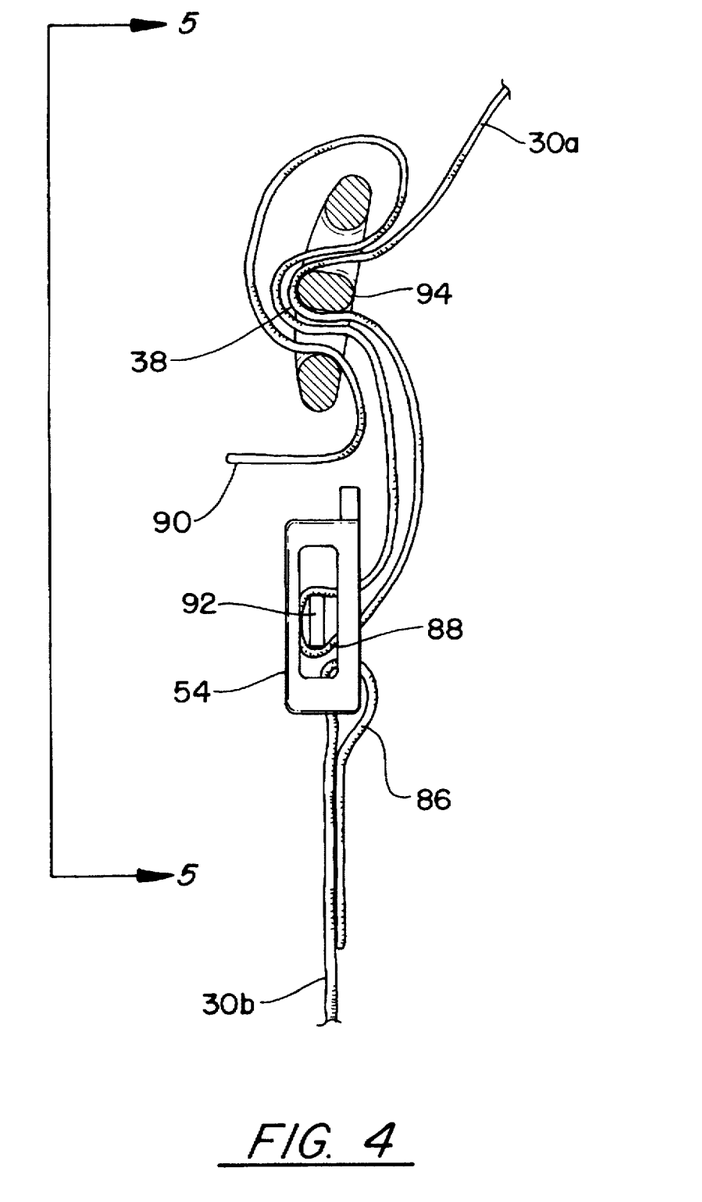
FIG. 4 is a partial cross sectional side view taken from line 4—4 of FIG. 2, showing a right shoulder strap adjustment of the present invention.
Figure 5:
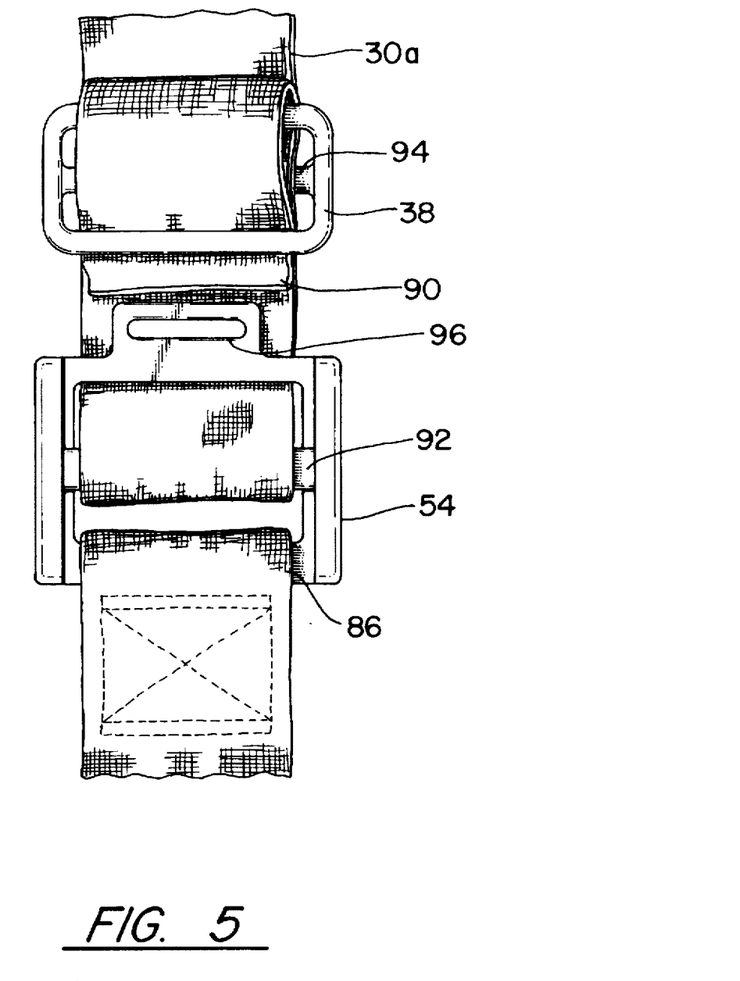
FIG. 5 is a partial elevational front view taken from line 5—5 of FIG. 4, showing the right shoulder strap adjustment of the present invention.

As shown in FIG. 3, the right shoulder strap 30 comprises a posterior portion 30a and an opposite anterior portion 30b. Likewise, the opposite left shoulder strap 32 comprises a posterior portion 32a and an opposite anterior portion 32b. The right shoulder strap 30 has a right shoulder strap connector 54, which connects the right shoulder strap portion 30a to the right shoulder strap portion 30b. The right shoulder strap 30 anterior and posterior portions cooperate with each other by a length adjustable slide fastener 38. As shown in FIGS. 4 and 5, the fastener 38 is a simple buckle wherein the right shoulder strap portion 30b has a first loop 86 secured to the right shoulder strap connector 54. The connector 54 has a connector slot 96, which is used with the seat strap portion described below. The right shoulder strap portion 30a has a second loop 88 secured around a buckle post 94 to connector post 92. The right shoulder strap portion 30a and a right shoulder strap extension 90 is fed through the adjuster 38 so as to allow the length of the right shoulder strap 30 to be adjusted to a variety of lengths.

Likewise, the left shoulder strap 32 has a length adjustable slide fastener 70, which is a simple buckle wherein the left shoulder strap portion 32b has a loop secured to a left shoulder strap connector 76 and the left shoulder strap portion 32a and a left strap extension 71 is fed through the adjuster 70 so as to allow the length of the left shoulder strap 32 to be adjusted to a variety of lengths. The left connector 76 has a connector slot 77, which cooperates with the seat strap portion 14 and is described below.

The harness 10 has a right hip strap D-ring 56 attached to the hip strap 26 between the right shoulder strap 30 and the right seat belt loop 34. The right D-ring 56 is generally parallel with the hip strap 26. Located between the left shoulder strap 32 and the left seat belt loop 36 is a left hip strap D-ring 78, which is attached to the hip strap 26.

As shown in FIG. 2, the right shoulder strap connector 38 has a connector cover 58, shown in plan view, which is made of a simulated lambs wool. The connector cover 58 has complementary hook and loop fasteners 60a and 60b so that the cover may be fastened around the strap connector 38. The connector cover 58 provides cushion between the connector 38 and the body of the wearer. At location 59a, the connector cover 58 may be sewn to the right shoulder strap 30 at location 59b, so that the cover 58 does not become unfastened and lost from the harness 10. The left shoulder strap 32 also has a connector cover 80 with hook and loop fasteners 82.

Figure 6:
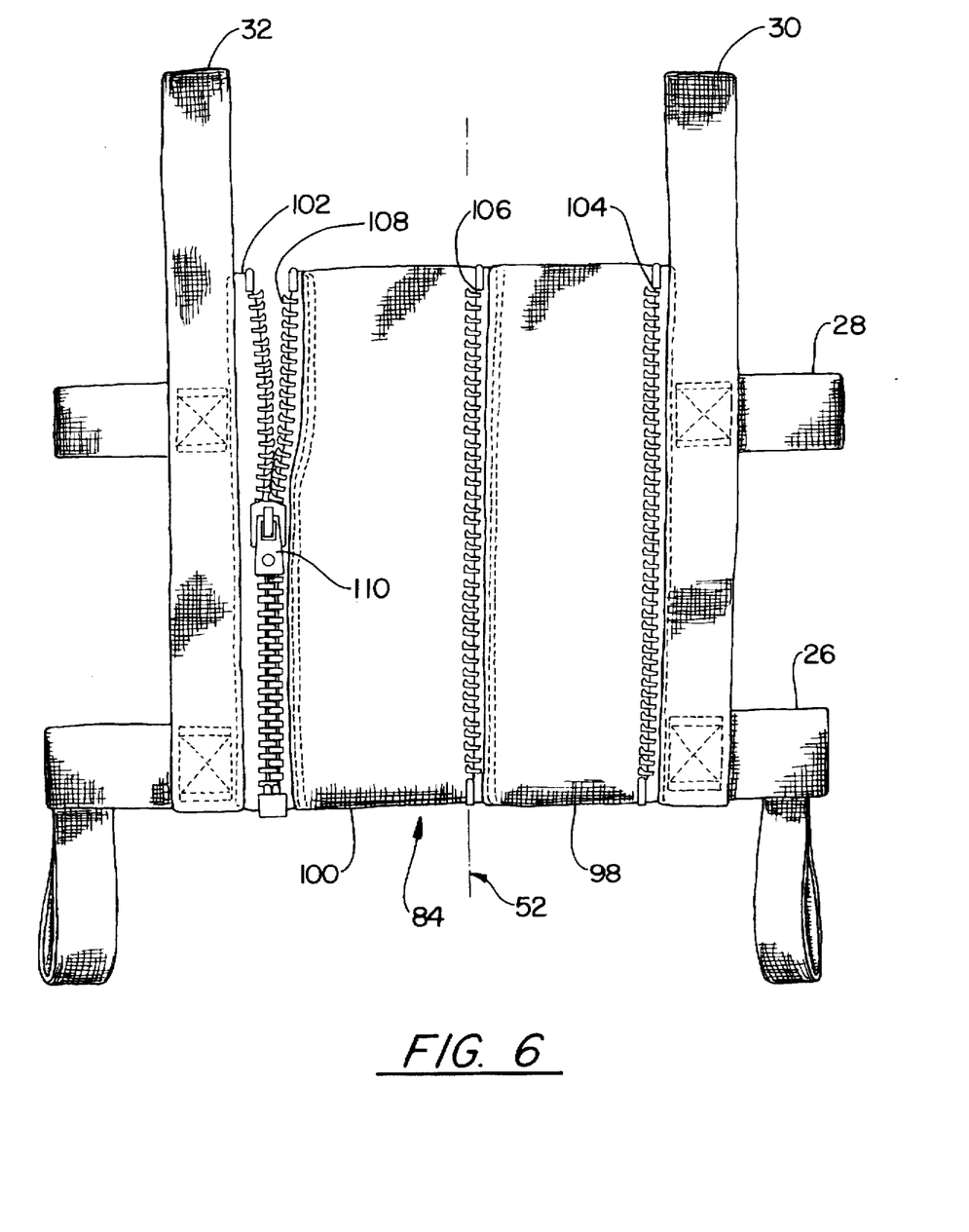
FIG. 6 is a rear elevational view of the restraint harness showing a posterior side fastener of the present invention.

As shown in FIG. 6, the vest portion 12 has a posterior side longitudinal axis 52 located between the left and right shoulder straps 30 and 32. Axially aligned with the posterior longitudinal axis is a posterior side fastener 84. Adjacent to the right shoulder strap 30 is a first fastener extension 98, which extends from the right shoulder strap 30 to the posterior longitudinal axis 52. A second fastener extension 100 is attached to the first fastener extension 98 and extends to the left shoulder strap 30.

A left shoulder strap zipper portion 102 is sewn to the left shoulder strap 32 at the posterior side 18. A zipper lever 110 is slidably attached to the left shoulder strap zipper portion 102. A left shoulder strap zipper portion 104 is sewn to the left shoulder strap 30 and is complimentary to the right shoulder strap zipper portion 102. At the juncture of the first fastener extension 98 and the second fastener extension 100 is a first fastener extension zipper portion 106, which is complementary to the left shoulder strap zipper portion 102.

As shown in FIG. 6, a second fastener extension zipper portion 108 is adjacent to the left shoulder strap zipper portion 102 and is sewn to the second fastener extension 100. Zipper portions 104, 106, and 108 cooperate with zipper portion 102 and zipper lever 110. This multiple zipper arrangement with width extensions between each zipper portion allow the vest portion 12 to be fastened to a number of wearers with varying torso widths and diameters; for a large torso, the fastener uses zipper portions 102 and 108, for a medium torso, the fastener uses zipper portions 102 and 106, and for a smaller torso, the fastener uses zipper portions 102 and 104. When using zipper portions 102 and 104, the extra material is folded internal of the vest portion 12. The fastener extensions 98 and 100 are sewn to the assembly so that there are no extra components to become lost from the assembly. The posterior side fastener 84 is made from a specially treated canvas so as to be durable and flame retardant.

Figures 7, 8:
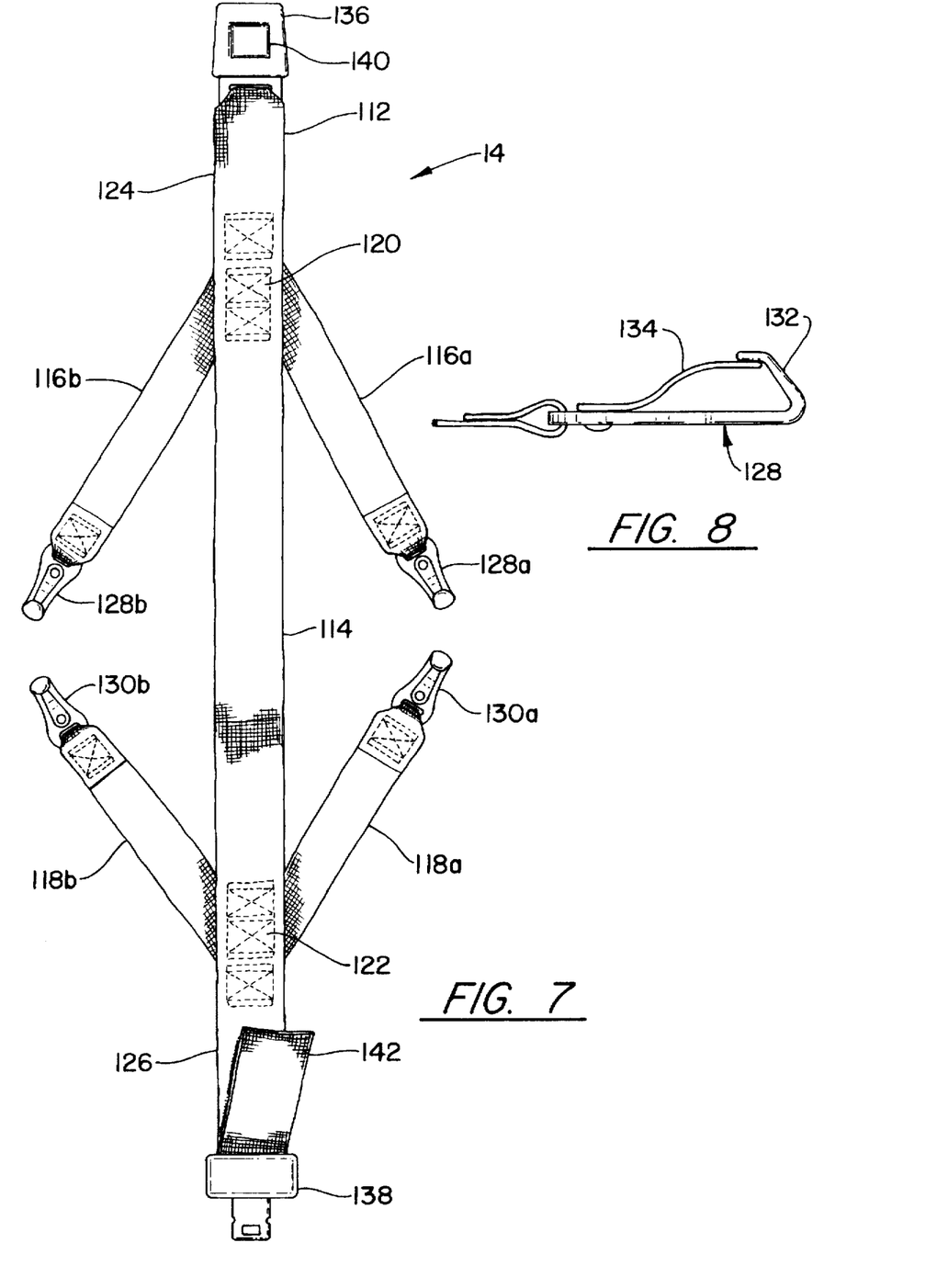
FIG. 7 is a plan view of a restraint harness seat strap portion of the present invention.
FIG. 8 is a side elevational view of a snap of the present invention.

As shown in FIG. 7, the seat strap portion 14 has a main longitudinal strap 112 with a center portion 114. A pair of first connecting straps 116a and 116b extend from the main longitudinal strap 112 at an acute angle, facing the center portion 114. The first connecting straps 116 are sewn to the main longitudinal strap 112 at intersection point 120. A pair of second connecting straps 118a and 118b extend from the main longitudinal strap 112 at an acute angle, facing the center portion 114 and facing the opposing first connecting straps 116a and 116b. The first and second connecting straps 116 and 118 are symmetrical to each other. The second connecting straps 118 are sewn to the main longitudinal strap 112 at intersection point 122.

The longitudinal strap 112 has a first strap extension 124 extending outwardly from the intersection point 120. At the end of the first strap extension 124 is a female buckle 136 with a release mechanism 140. The longitudinal strap 112 also has a second strap extension 126 extending outwardly from the intersection point 122. At the end of the second strap extension 126 is a male buckle 138 that is complimentary to the female buckle 136. A third strap extension 142 is positioned through the male buckle 138 and may be used to adjust the overall length of the longitudinal strap 112.

At the termination point of the first connecting straps 116a and 116b is a first pair of snaps 128a and 128b. Likewise, at the termination point of the second connecting straps 118a and 118b is a second pair of snaps 130a and 130b. As shown in FIG. 8, the snaps each have a "J" hook 132 and an interlocking spring 134. The first pair of snaps connect to the shoulder straps 30 and 32 by snapping onto the right and left connectors, through the connecter slots 96 and 77. The second pair of snaps connect to the hip strap 26 by snapping onto the D rings 56 and 78.

The straps are made from a commercially available nylon webbing, similar to the material used for automobile seat belts.

The buckle 138 and 140 is similar to commercially available seat belt buckles used for automobiles.

The posterior side fastener 84 is made from a nylon material; however, any length adjustable fastener would be suitable. For example, hook and loop fasteners with overlapping fastening areas would provide an alternative length adjustable fastening means.

Figure 9:
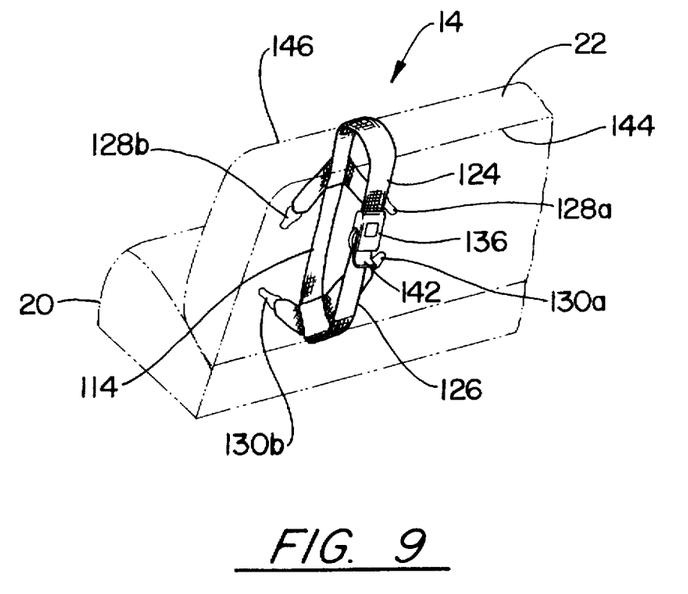
FIG. 9 is a rear perspective view of the restraint harness seat strap portion of the present invention.

The harness vest portion 12 is fastened around the passenger and fastened together. The harness vest portion 12 is then adjusted to fit snugly on the passenger by tightening the straps with the adjusters. As shown in FIG. 9, the seat strap portion 14 is placed around the seat back 22. The seat back 22 has an anterior side 146 and a posterior side 144. The center portion 114 and the connecting straps 116 and 118 are placed on the seat back anterior side 146. The female and male buckles 138 and 140 are fastened together at the seat back posterior side 144. The passenger is then placed on the seat in a sitting position, then the slack is removed from the seat strap portion 14 by pulling on the third strap extension 142. The snaps 128a and 128b are fastened through the connector slots 96 and 77 respectively. The snaps 130a and 130b are fastened to the D rings 56 and 78 respectively. The existing seat belt 24 is placed through the right and left belt loops 34 and 36. After placement of the harness 10 on the passenger and the fastening of the connector straps and the seat belt to the harness, the passenger is secured to the seat 20 in a safe and comfortable sitting position.

Figure 10:
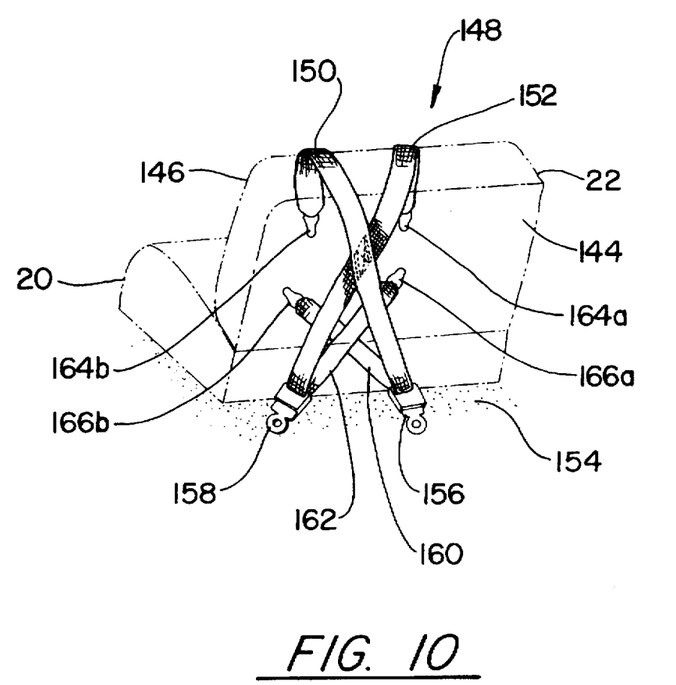
FIG. 10 is a rear perspective view of a separate embodiment of the present invention showing an alternative restraint harness seat strap portion.

A separate embodiment of the present invention is shown in FIG. 10, wherein the restraint harness of the separate embodiment is similar to the above described restraint harness except that the seat strap portion is fastened to the floor instead of being fastened to the seat back.

As shown in FIG. 10, a separate embodiment of a seat strap portion 148 of the present invention is shown with the similar features as the seat strap portion shown in FIG. 9 and described above, except that the seat strap portion 148 is fastened to the floor 154. The seat strap portion 148 has a first strap 150 and a second strap 152. The straps 150 and 152 are positioned to make an "X" configuration at the posterior side 144 of the seat back 22. A first floor fastening means 156 fastens to the floor 154, which secures the first strap 150 to the floor 154. A second floor fastening means 158 fastens to the floor 154, which secures the second strap 152 to the floor 154.

A first strap extension 160 extends from the first fastening means 156, between the seat 20 and the seat back 22. The first strap extension 160 is secured to the floor 154 by the first fastening means 156. A second strap extension 162 extends from the second fastening means 158, between the seat 20 and the seat back 22, forming an "X" configuration with the strap extensions 160 and 162. The second strap extension 162 is secured to the floor 154 by the second fastening means 158.

The first strap 150 and the second strap 152 each have a snap 164b and 164a respectively at the termination points adjacent to the seat back 22. The first strap extension 160 and the second strap extension 162 each have a snap 166b and 166a respectively at the termination points adjacent to the seat 20. The snap 164b fastens to the left shoulder connector slot 77, the snap 164a fastens to the right shoulder connector slot 96. Likewise, the snap 166b fastens to the left hip strap D ring 78 and the snap 166a fastens to the right hip strap D ring 56.

After placement of the harness on the wearer, and the fastening of the seat strap portion to the vest portion, the seat belt is placed through the harness. The passenger is then secured to the seat in a safe and comfortable sitting position.

The advantage of the harness of the present invention versus the prior harnesses is that the harness of the present invention discloses a structural design to allow for maximum disbursement of a load or force throughout the harness in the event of an automobile accident.

Another advantage of the harness of the present invention is the posterior side fastener, which allows for width or diameter adjustment of the vest portion so that a wide variety of torso sizes may be accommodated with a one size harness. The width adjustment allows for fluctuations in weight by a user and allows for expansion during seasonal changes, such as the wearing of a winter clothes and a winter coat.

Although this invention has been shown and described with respect to a detailed embodiment, those skilled in the art will understand that various changes in form and detail may be made without departing from the spirit and scope of the claimed invention.

I claim:

1. A restraint harness for securing a passenger in a sitting position to a seat, comprising:

a vest portion and a seat strap portion;

said vest portion comprising a plurality of straps to encompass the passenger's torso;

said seat strap portion comprising means to fasten the vest portion to the seat;

said vest portion having an adjustable fastening means to accommodate a variety of torso diameters and at least two lateral straps that generally laterally encircles the passenger's torso area.

2. The restraint harness of claim 1, wherein said vest straps each further comprise a length adjustable fastening means.

3. The restraint harness of claim 1, wherein said vest portion comprises an anterior side and a posterior side, said seat strap portion fastening to said anterior side of said vest.

4. A restraint harness for securing a passenger in a sitting position to a seat, comprising:

a vest portion and a seat strap portion;

said vest portion comprising a plurality of straps to encompass the passenger's torso;

said seat strap portion comprising means to fasten the vest portion to the seat;

said vest portion having an adjustable fastening means to accommodate a variety of torso diameters;

wherein said vest straps comprise:

an anterior side and a posterior side;

a hip strap adapted to fit laterally around the passenger's hip area;

a chest strap adapted to fit laterally around the passenger's chest area, said chest strap being generally parallel to said hip strap;

a right shoulder strap and a left shoulder strap, said shoulder straps extending from each respective shoulder and extending anteriorly and posteriorly along the passenger's torso to intersect with said chest strap and said hip strap at said anterior side and said posterior side, said shoulder straps being fastened to said chest straps and said hip straps;

said left shoulder strap having a left connector at said anterior side of the left shoulder strap and said right shoulder strap having a right connector at said anterior side of the right shoulder strap;

said seat strap portion fastening to said left and right connectors.

5. The restraint harness of claim 4, wherein said connectors are covered by a removable connector cover adapted to provide cushion between said connectors and the torso of the wearer.

6. The restraint harness of claim 4, wherein said hip strap further comprises:

a right hip strap D ring located on said anterior side of said vest between said right shoulder strap and said right seat belt loop;

a left hip strap D ring located on said anterior side of said vest between said left shoulder strap and said left seat belt loop;

said seat strap portion fastening to said left and right connectors and said left and right D rings.

7. The restraint harness of claim 4, wherein the vest further comprises:

a right seat belt loop extending from the hip strap at the anterior side, said right seat belt loop being in close proximity to said right shoulder strap;

a left seat belt loop extending from the hip strap at the anterior side, said left seat belt loop being in close proximity to said left shoulder strap;

said loops being adapted to accept an existing seat belt.

8. The restraint harness of claim 4, wherein each said shoulder strap further comprises:

an anterior portion and a posterior portion;

said anterior and posterior portions cooperating with each other by a length adjustable slide fastener so that each said shoulder strap is independently length adjustable.

9. The restraint harness of claim 4, wherein said seat strap portion further comprise a conventional seat belt buckle with a male portion, a mating female portion, a release mechanism, and a length adjustable slide mechanism.

10. A restraint harness for securing a passenger in a sitting position to a seat, comprising:

a vest portion and a seat strap portion;

said vest portion comprising a plurality of straps to encompass the passenger's torso;

said seat strap portion comprising means to fasten the vest portion to the seats;

said vest portion having an adjustable fastening means to accommodate a variety of torso diameters;

wherein said vest portion adjustable fastening means further comprises:

a first fastener extension located adjacent to said right shoulder strap at said posterior side;

a second fastener extension located between said first fastener extension and said left shoulder strap at said posterior side;

a first zipper portion being fastened to said left shoulder strap at said posterior side;

said first and second fastener extensions having zipper portions complementary to said first zipper portion, so that said vest may accommodate a variety of torso sizes.

11. The restraint harness of claim 4, wherein said straps are made of a nylon webbing material.

12. A restraint harness for securing a passenger in a sitting position to a seat, comprising:

a vest portion having a pair of shoulder straps and a pair of lateral straps;

said lateral straps comprising a chest strap and a hip strap, said lateral straps being adapted to fit laterally across the passenger's chest area and hip area, said vest straps being generally parallel with each other;

said shoulder straps being adapted to fit over the passenger's shoulders, said shoulder straps extending anteriorly and posteriorly to said hip strap so that said shoulder straps intersect with said chest strap and said hip strap, said shoulder straps being generally perpendicular to said lateral straps, said shoulder straps and said lateral straps being fastened together;

said lateral straps having fastening means so that the straps may be fastened and unfastened around the torso of the passenger;

said vest portion having an adjustable fastening means to accommodate a variety of torso diameters;

a seat strap portion comprising means to fasten said vest portion to the seat.

* * * * *